Feb. 13, 1923.
J. PRESCOTT.
PISTON RING.
FILED APR. 16, 1921.
1,444,938.
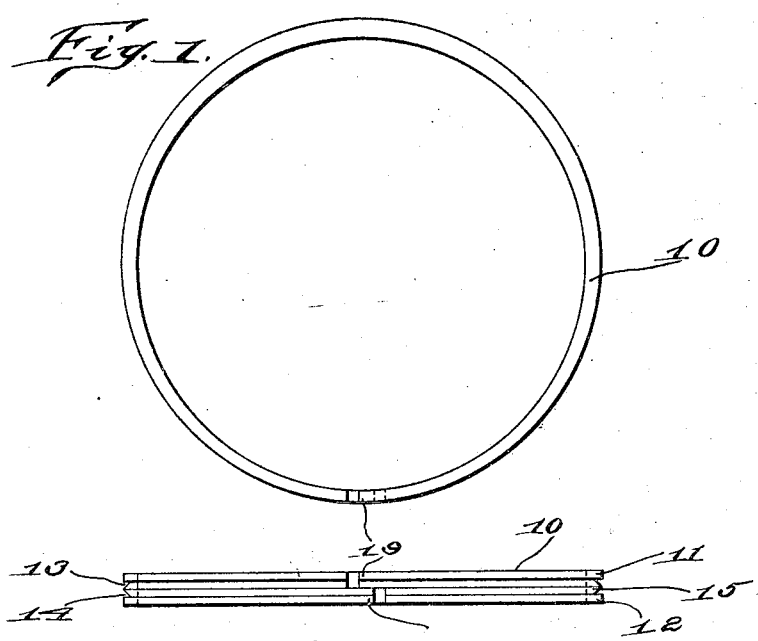
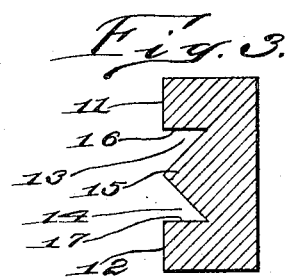
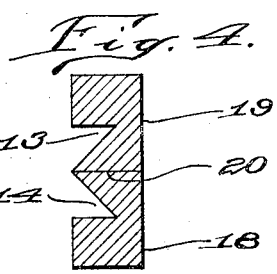
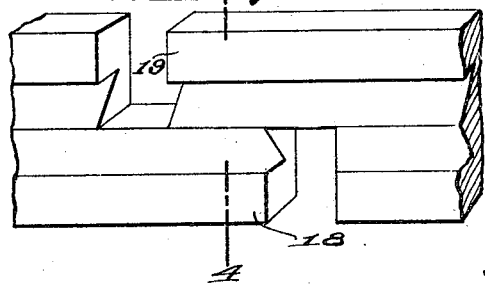
Inventor:
Jesse Prescott
by Clyde L. Rogers
his atty.

Patented Feb. 13, 1923.

1,444,938

UNITED STATES PATENT OFFICE.

JESSE PRESCOTT, OF WEBSTER, MASSACHUSETTS.

PISTON RING.

Application filed April 16, 1921. Serial No. 461,779.

*To all whom it may concern:*

Be it known that I, JESSE PRESCOTT, a citizen of the United States, and resident of Webster, county of Worcester, Commonwealth of Massachusetts, have invented an Improvement in Piston Rings, of which the following description, in connection with the accompanying drawings, is a specification, like characters on the drawings representing like parts in each of the several views.

This invention relates to piston rings and while having other and more general fields of usefulness is well adapted and designed for use in pistons of internal combustion engines, particularly of automobiles. A principal object of the invention is to provide a simple and cheaply produced piston ring, that provides a maximum extent of seating or wear surface in proportion to its width, combined with a provision of a plurality of separated oil reservoirs, intermediate the width of the piston, which assures a light film of oil at all times on the cylinder walls, i. e., constituting a self oiling ring, and wherein the annular reservoirs of oil borne by the piston serve most effectually to prevent the leakage of oil inward of the cylinder or of gas outward thereof. In accordance with my invention a relatively larger extent of bearing or wear surface of the ring is provided in two portions spaced relatively far apart at the sides of the ring so that an even, uniform seating of the ring is assured, the outer boundary of these bearing surfaces being preferably formed with square edges to more effectively prevent the leaking past of oil and gas. In accordance with my invention two annular reservoir portions of the ring are segregated from each other by an intermediate conical section, the point of which preferably extends outward to the line of the wear surface of the ring. This provides in conjunction with the relatively wide spaced apart wear surfaces at the sides of the ring, a maximum dimension of the two intermediate oil reservoirs that are at the same time completely segregated from each other. It also provides means whereby leakage at the overlapping edges of the ring is prevented. The foregoing and other objects and advantages of the invention will more fully appear from the following detailed description, and the distinctive features of novelty will be pointed out in the appended claims.

Referring to the drawings:

Fig. 1 is an elevation of the piston ring embodying the invention;

Fig. 2 is an edge view thereof;

Fig. 3 is a relatively enlarged transverse section through the ring;

Fig. 4 is a similar transverse section on line 4—4 of Fig. 5; and

Fig. 5 is a detail perspective view illustrating the seal provided by the intermediate conical rib at the overlapping ends of the ring.

10 indicates the piston ring of my invention which is shown as generally rectangular and oblong in cross-section. In accordance with my invention the outer surface of the ring is recessed intermediate the width thereof to provide at each side substantially spaced apart continuous and relatively extended bearing or wear surfaces 11, 12. The intermediate recess formation comprises two distinct grooves 13, 14 which are separated by a partition 15 with sloping sides and being thus of conical section with the point thereof substantially in the line of the wear surfaces 11, 12. It will be understood that a prime purpose of this intermediate partition is to break up the transverse continuity of the reservoir and provide instead, two relatively isolated reservoirs, whereby should any fluid force its way into one of said reservoirs, its impact is dissipated therein and it is prevented from passing the intermediate partition and through the other reservoir, and thus prevented from getting past the ring as a whole. The outer walls 16, 17 of these grooves extend radially inward of the ring making right angle edges with the surfaces 11, 12. The extremities of the ring are rebated and split so as to provide overlapping side portions 18, 19, these rebates extending to the transverse center of the ring and thus intersecting the apex of the sloping partition as indicated at 20. With this construction it will be noted that I provide bearing or wear surfaces 11, 12 substantially spaced apart, and in conjunction therewith a plurality of intermediate recess reservoirs for oil that are segregated from each other. Since the bearing surfaces are of substantial extent at each side of the ring, i. e., the greatest possible for a given width dimension of ring and with the described segregated reservoirs, it results that the ring is insured an even and uniform seating in the cylinder and its wearing qualities are largely enhanced. Since the intermediate partition has its top extending outward into alinement with the bearing surfaces, the two reservoirs are completely isolated from each other and a cumulative effect thereof is obtained in checking and blocking absolutely any passage of oil therethrough into the cylinder or of gas from the cylinder. Further this intermediate partition at the lapped ends of the ring serves to prevent any passage of fluid through the ring when the ends thereof are somewhat extended apart as indicated in Fig. 5. I attach a special importance to the provision of square edges at both sides of the bearing surfaces 11, 12, since I have found in actual practice that this feature in conjunction with the intermediate recess reservoirs is most efficacious in preventing the pasage of fluid past the ring. Since the recess reservoirs are continuous around the circumference of the ring and are of relatively larger capacity in proportion to the total cross section of the ring, a uniform and even distribution of oil is insured so that the piston and ring rides constantly on a film of oil. The described construction thus provides a ring of exceptional wearing quality, the accurate seating whereof is insured, and combines with these desirable qualities, provision for plural, relatively segregated oil reservoirs, the effect whereof results in a ring of highly efficient packing properties. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A one-piece piston ring comprising opposite side portions presenting relatively wide wear surfaces and an intermediate portion recessed, with an intermediate wall having sloping sides extending to a point in the peripheral line of the ring whereby separate oil reservoirs of relatively substantial capacity isolated from each other and from the base of the ring are provided.

2. A one-piece piston ring having relatively wide bearing surfaces at its opposite sides with said surfaces bounded by rectangular edges at each side thereof, the intermediate portion of the ring being recessed to form separate oil reservoirs isolated from each other and from the base of the ring, with a partition therebetween, the walls whereof converge outwardly of the ring.

3. A one-piece piston ring comprising bearing surfaces of relatively substantial width at the two sides of the ring with an intermediate recess extending circumferentially of the ring and divided into two reservoirs isolated from each other by a partition of conical cross-section, the point whereof extends substantially into line with said bearing surfaces.

In testimony whereof, I have signed my name to this specification.

JESSE PRESCOTT.